(12) United States Patent
Giannetti et al.

(10) Patent No.: US 8,786,888 B2
(45) Date of Patent: Jul. 22, 2014

(54) CLOUD PROCESSING FOR PRINT JOBS

(75) Inventors: Fabio Giannetti, Los Gatos, CA (US); Shaun Henry, Middleton, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 61 days.

(21) Appl. No.: 13/560,497

(22) Filed: Jul. 27, 2012

(65) Prior Publication Data

US 2014/0029047 A1    Jan. 30, 2014

(51) Int. Cl.
*G06F 3/12* (2006.01)

(52) U.S. Cl.
USPC ........ 358/1.15; 358/1.13; 358/1.14; 358/1.16

(58) Field of Classification Search
CPC ..... G06F 3/1247; G06F 3/1211; G06F 3/122; G06G 9/6053
USPC ..................... 358/1.13, 1.15, 1.18, 1.14, 1.16
See application file for complete search history.

(56) References Cited

U.S. PATENT DOCUMENTS

| | | | | |
|---|---|---|---|---|
| 7,016,061 | B1 * | 3/2006 | Hewitt | 358/1.15 |
| 8,234,654 | B2 * | 7/2012 | Green et al. | 718/105 |
| 2005/0015779 | A1 * | 1/2005 | Christiansen | 719/327 |
| 2007/0070376 | A1 * | 3/2007 | Owen et al. | 358/1.13 |
| 2009/0299905 | A1 | 12/2009 | Mestha et al. | |
| 2011/0228313 | A1 * | 9/2011 | d'Entrecastaux | 358/1.15 |
| 2011/0242555 | A1 | 10/2011 | Nakajima | |
| 2011/0242575 | A1 | 10/2011 | Owen et al. | |
| 2012/0057191 | A1 | 3/2012 | Gnanasambandam et al. | |
| 2012/0274976 | A1 * | 11/2012 | Bhatia et al. | 358/1.15 |

OTHER PUBLICATIONS

Bear, "*What You Need to Know About Raster Image Processing*", http://desktoppub.about.com/cs/rip/a/rip.htm.

* cited by examiner

*Primary Examiner* — Dennis Dicker

(57) ABSTRACT

A system includes an estimator to analyze an input file that describes a print job, to analyze local feedback data that describes local capacity to process the print job by a local print preprocessor, and to analyze remote feedback data that describes remote capacity to process the print job by a cloud-based print preprocessor, wherein the estimator determines a time estimate for the local print preprocessor or the cloud-based print preprocessor to process the print job based on the analyzed input file, the analyzed local feedback data, or the analyzed remote feedback data. A scheduler receives the time estimate from the estimator to determine whether to route the print job to the local print preprocessor or the cloud-based print preprocessor to process the print job.

18 Claims, 7 Drawing Sheets

CLOUD PROCESSING FOR PRINT JOBS

BACKGROUND

A Print Service Provider (PSP) has the need to ensure enough processing capability in order to meet the highest levels of print demand. For instance, the PSP often employ Raster Image Processors (RIPs) to process print files in preparation of printing and to address the respective overall print workload. Unfortunately, as any business, the workload can be unpredictable as well as having spikes in printing demand. In order to address this demand, the PSP has to account for worst case scenarios (e.g. Holiday Season). Such accounting typically means that the PSP will maintain additional processing capability for the few times in the year that the additional capability may be required.

DETAILED DESCRIPTION

Hybrid preprocessing systems and methods are provided to enable print service providers to utilize cloud preprocessing services during peak demand periods while mitigating the need for expensive preprocessing services to be maintained in house. In one example, internal and external auditing components provide feedback to estimate preprocessing capabilities for both in-house and cloud-based resources. A jobs profiler can analyze a respective print job to determine its complexity such as how much time would be involved to perform preprocessing that can include Raster Image Processing, for example. Based on the analysis from the jobs profiler and feedback from the auditing components, a scheduler can determine whether a print job can be serviced in-house in view of all other jobs that may be pending and the complexity of the analyzed printing task at hand. In some cases, print preprocessing can be offloaded to cloud-based preprocessing services to facilitate completion of the print job in a timely manner during peak demand periods while mitigating the need to maintain such preprocessing capability in-house and that may not also be needed for normal demand situations.

Figure 1:
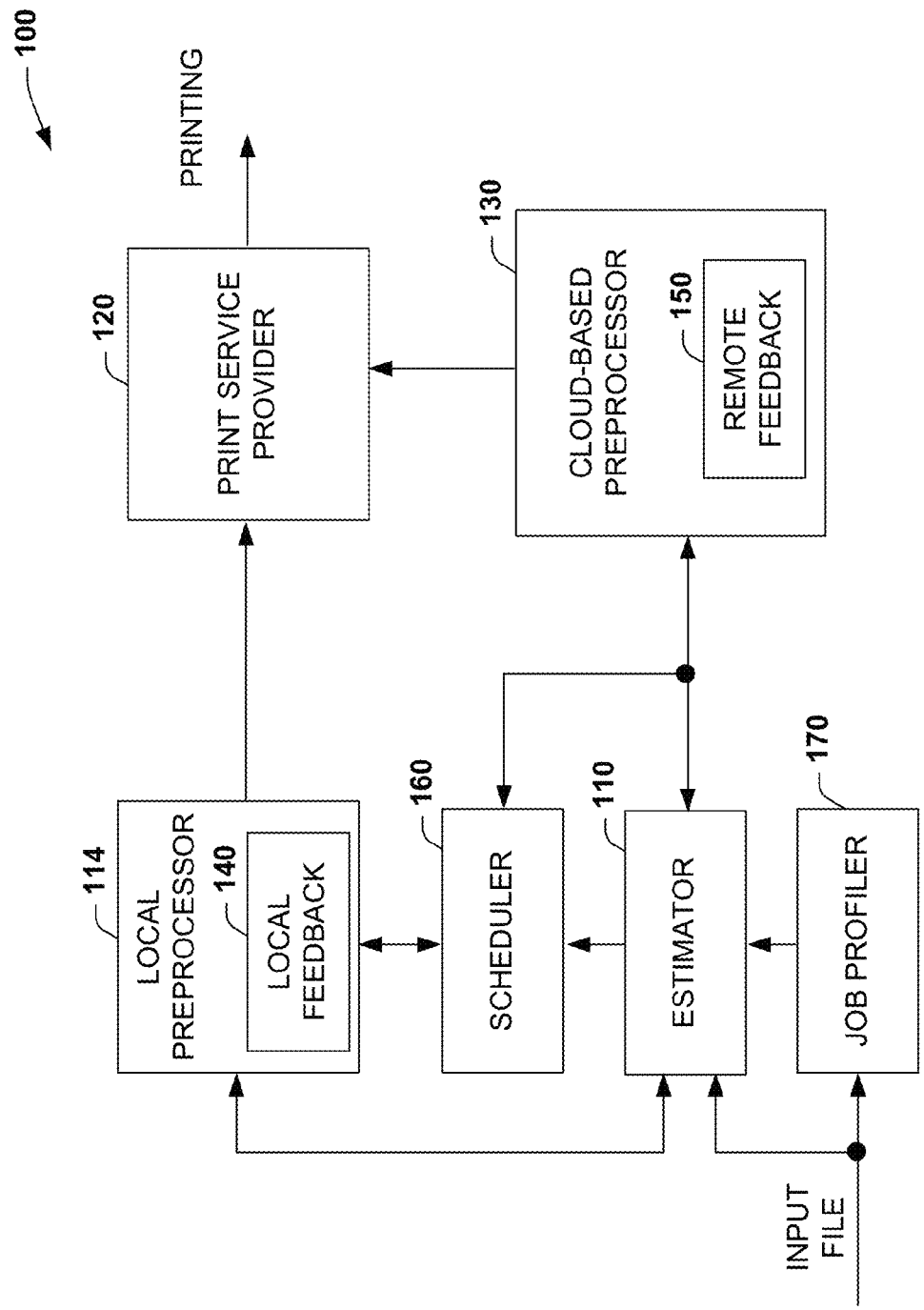
FIG. 1 illustrates an example of a system that facilitates hybrid cloud preprocessing for print jobs.

FIG. 1 illustrates an example of a system 100 that facilitates hybrid cloud preprocessing for print jobs. The system 100 includes an estimator 110 configured to analyze an input file that describes a print job (e.g., PDF file describing print file). The estimator 110 can determine how much time is involved to preprocess the input file and what capabilities a local print preprocessor 114 associated with a print service provider 120 (PSP) and a cloud-based preprocessor 130 (e.g., server farm operating on input file) 130 may have for such preprocessing. The estimator 110 can analyze local feedback data 140 that describes local capacity to process the print job by the local print preprocessor 114 and can also analyze remote feedback data 150 that describes remote capacity to process the print job by the cloud-based print preprocessor 130. Thus, the estimator 110 can determine a time estimate for the local print preprocessor 114 associated with the PSP 120 or the cloud-based print preprocessor 130 to process the print job based on the analyzed input file, the analyzed local feedback data 140, or the analyzed remote feedback data 150. As will be illustrated and described below with respect to FIGS. 3 and 4, the local feedback data 140 and remote feedback data 150 can be generated by auditing components or functions that report local or cloud-based preprocessing and/or printing capabilities (e.g., capacity to preprocess input file and/or print preprocessed file).

A scheduler 160 receives the time estimate from the estimator 110 to determine whether to route the print job based on the input file to the local print preprocessor 114 and/or the cloud-based print preprocessor 130 to process the print job. In one example, the local print preprocessor 114 and the cloud-based print preprocessor 130 is a raster image processor (RIP) (or processors) that receives the input file that describes the print job and generates an output file (e.g., JLT file) suitable for a printer to print the print job. A jobs profiler 170 which is described below can utilize statistical and/or learning techniques to determine the complexity of the input file and facilitate with the time analysis by the estimator 110. The estimator 110, scheduler 160, and jobs profiler 170 can be combined as a single component or can be distributed across systems wherein one or more of the components can be operated by the PSP 120 and/or by the cloud-based preprocessor 130.

The system 100 supports hybrid preprocessing by enabling the PSP 120 to utilize the cloud-based preprocessor 130 during peak demand periods while mitigating the need for expensive preprocessing services to be maintained in house. In one example, internal and external auditing components (illustrated below with respect to FIGS. 3 and 4) provide local feedback 140 and remote feedback 150 to estimate preprocessing capabilities for both in-house and cloud-based resources. The jobs profiler 170 can analyze a respective print job from the input file to determine its complexity such as how much time would be involved to perform preprocessing that can include Raster Image Processing, for example. Based on the analysis from the jobs profiler 170 and feedback from the auditing components, the scheduler 160 can determine whether a print job can be serviced in-house in view of all other jobs that may be pending and the complexity of the analyzed printing task at hand. In some cases, print preprocessing can be offloaded to the cloud-based preprocessor 130 to facilitate completion of the print job in a timely manner during peak demand periods while mitigating the need to maintain such preprocessing capability in-house and that may not also be needed for normal demand situations.

As used herein, cloud resources such as the cloud-based preprocessor 130 (also referred to as cloud, cloud infrastructure, or cloud environment) are all hardware and software components that support a given cloud configuration including servers and databases, for example. The term "cloud" can be a hybrid such that it can be a combination of traditional data centers that are made to behave like infrastructure resources, private clouds (cloud technology developed on premise), public clouds (offered by service providers and managed cloud configurations (managed on premise or in a public cloud/virtual private cloud).

The PSP 120 should be able to produce all print jobs accepted within the established deadlines. Failing to do so in a timely manner, the PSP 120 can suffer loss of income, penalties and ultimately loss of clients. Currently the PSP 120, in order to avoid this situation, may be forced to buy enough local servers and preprocessing (e.g., RIPs) to satisfy the highest job volumes and tightest deadlines. The system 100 mitigates such problems by offloading peak-demand requirements onto the cloud-based preprocessor 130. In one example, the estimator 110 can be integrated with the scheduler 160 and receive feedback 140 and 150 from the preprocessors for the execution time. The estimator 110 can have support from the job profiler 170, wherein the job profiler analyzes the input file (e.g., PDF) identifying the presence of an object's re-use and/or transparency, for example. This enables the estimator 110 to predict the time a print job can take to be preprocessed with a suitable degree of confidence. This also facilitates predicting whether or not to push a print job to the preprocessor 130 in the cloud or not, and to provide recommendations on how many RIPs (or other preprocessing) to allocate and how to partition the job. This information can be fed back into the scheduler 160.

The scheduler 160 has the overall view of all the jobs in the system 100 and it can prioritize jobs based on their deadline and the expected production time. If the print job has enough time left before it needs to be shipped (considering all the other steps after preprocessing), the job can be sent to the cloud asking for a specific number of RIP instances, for example. As an example of such scheduling, Job A can be scheduled to be shipped in 24 hrs. The job may require 17 hrs (or other time) to be produced considering all the steps from printing onwards. This leaves 7 hrs for the job to be RIPped, for example. The job may be large and require 100 thousand sheets and it may be pre-imposed. This may be a suitable candidate for 0 in the cloud. If the 100 thousand sheets can be RIPped in less than an hour employing 100 RIPs (1000 pages roughly is executed in 1 hrs) than the transfer can be sustained easily having 6 hrs left. The following examples describes various processing cases for the above example.

The job profiler 170 identifies if there is a high level of re-use within the job, for instance even and odd pages are 80% the same. In this case, partitioning the job among the 20 RIPs can reduce speed, since each instance should re-RIP the reusable part at least 19 extra times. The estimator 110 can now predict that the job will take 2 hrs to be RIP'ed using 2 RIPs only, for example. In this example case, the scheduler 160 determines that this job is not a good candidate for RIPping in the cloud, since the data transfer exceeds the benefits from RIPping in-house via the local preprocessor 114.

In another example, the job profiler 140 identifies that there is a high amount of transparency, no reuse, and pages have a high number of objects. This usually indicates a particularly complex job that may require substantial RIPping power. The estimator 110 can now estimate that with the available 20 RIPs that can be processed locally, that the job cannot be completed in 7 hrs. Thus, the estimator 110 can now recommend the hybrid approach wherein some of the processing is automatically transported to cloud-based preprocessing 130. The print job can be pre-imposed a certain amount of sheets (at the beginning of the job) and can be RIPped locally employing the 20 RIPs to ensure that the printing press has enough buffer to start printing the job before the remaining parts are delivered through the cloud. The print job can then be partitioned accordingly and sent to the cloud where a higher number of RIPs is allocated to compensate the ripping time vs. transfer time. In case the print job was not pre-imposed, a job partitioning engine (not shown) can interpret the imposition requirements and send to the cloud the pages that are required at the end of the job.

In yet another example, the job profiler 170 identifies that the print job does not have re-use nor transparency or high number of objects. This job can be considered average and the estimator 110 can predict it will take 5 hrs to RIP with the locally available 20 RIPs. This provides the scheduler 160 the possibility of either RIP the job in house or sent to the cloud based on the priority and requirements of other jobs in the queue. This demonstrates how the synergies between a profiler and estimator can inform the scheduler 110 on how to appropriately leverage the local resources vs. cloud resources. The estimator 110 can also have access to the processing times for jobs RIPped locally and in the cloud. This can enable the estimator 110 to refine its predictions becoming more specific to the particular set of jobs that are the bulk of work for the PSP 120. The hybrid approach between cloud and local resources enables job and load balancing between local and cloud resources based on where the jobs are coming from. In one example, jobs that are already residing in the cloud and can be pushed to the PSP 120 either in PDF format (need to be RIPped) or JLT format (pre-RIPped).

The following now describes an iterative learning process that can be applied by the jobs profiler 170 to determine the complexities involved with a print job such as analyzing a PDF input file. Various PDF files (jobs) can be analyzed using a PDF profiler to extract the various characteristics. These characteristics can include: an FS—File Size (MB) representing the size of the file in the file system. The file size reflects the amount of images and complex data representing the PDF and its re-use. Larger PDF files are usually more complex to RIP and smaller PDF are simpler or leverage re-use. Another characteristic can include PS—Page Size (millipoint) representing the overall area of the page (or sheet) to be produced. This affects RIPping in two ways: first it is related to the amount of data to process that increases with the page size and second the amount of data produced as output. A third characteristic includes NP—Number of Pages (integer) representing how many pages (or sheets) the PDF is composed of. There is a correlation between the number of pages and its RIP time, sometimes this is directly proportional and sometimes it is in correlation with other aspects described herein. Another characteristic includes OA—Overall Area without Reuse or Transparency (millipoint) representing the amount of objects in all pages that have to be rastered by the RIP. These objects when rastered can be placed in the output for printing and disposed.

Another characteristic for analyzing the PDF input file includes AR—Overall Area with Reuse (millipoint) representing the amount of objects in all pages that when rastered can be reused throughout the document. When an object is reused, it can be cached and placed in the new page without other computation significantly speeding the RIPping operation. Yet another characteristic of the PDF file is TP—Transparency Pervasiveness (percentage) representing the percentage of pages with transparency. These pages typically reduce RIP performance by not allowing the RIP to raster their content in parallel. This can be due to that there are interactions between the objects and their transparency, and that can fundamentally change the appearance of underneath objects. Using these parameters and characteristics, it is possible to characterize the PDF documents into separate classes. These classes can represent the fundamental characteristic of the PDF and should allow tailoring the correlation with RIP performances in a more accurate way. The classifications can include a Plain Documents Class where these are PDF files that do not present any transparency or reuse. Another classification can include a Transparent Documents Class where these are PDF files where portions of the content in some pages have transparent settings. Yet another classification can include a Reuse Documents Class where these are PDF files where a portion of the content can be effectively reused in some pages. The reusable content can be stored in the PDF as XObject, for example.

After the PDF files have been classified, two sets can be generated—a training set and a testing set. The training set can be RIPped several times and the PDF characteristics, highlighted above, can be used to model a formula. The model can be built finding the highest correlation values between the PDF characteristics and the training set RIP execution times. The training set should be as representative as possible for each class; hence max, min and average values of individual characteristic can be identified and the corresponding PDF documents selected, for example. This allows creating an empirical function to compute a PDF complexity as illustrated by Equation 1.

$$Compl=w_0FS+w_1PS+w_2NP+w_3OA+w_4TP-w_5AR$$

Figure 2:
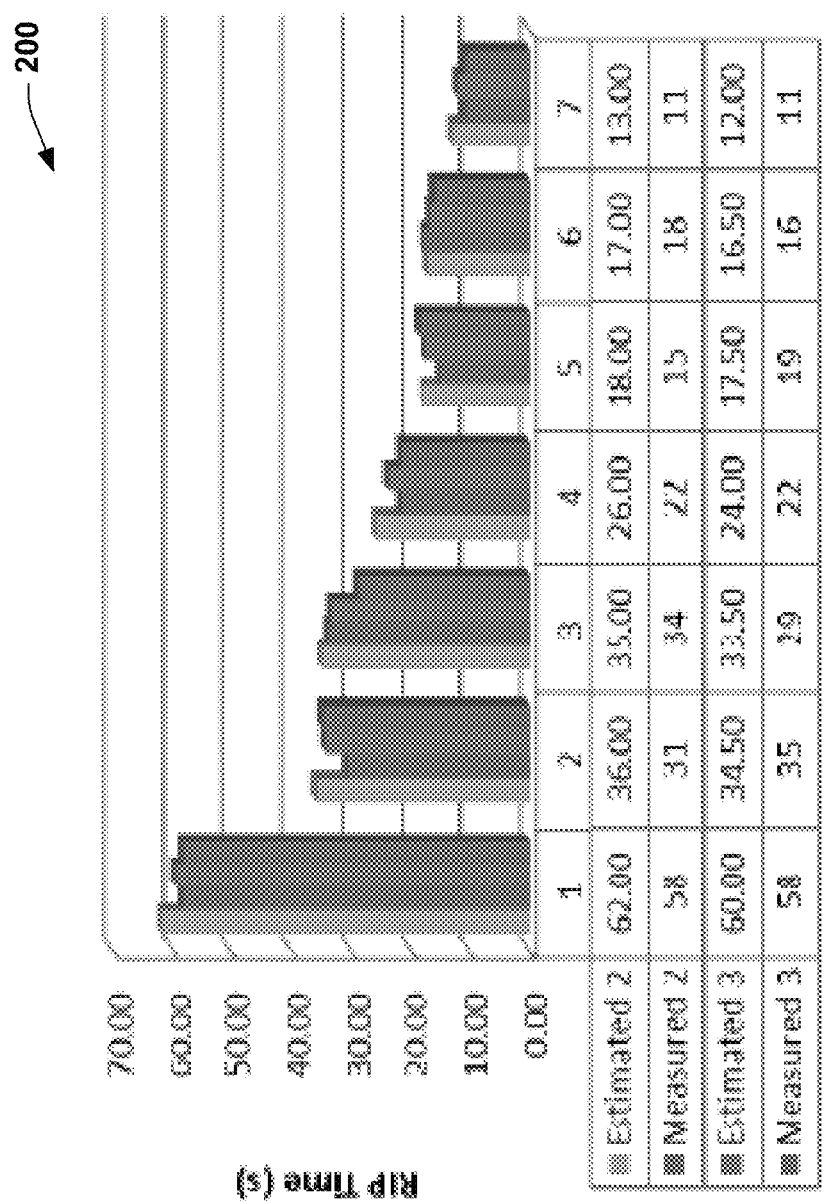
FIG. 2 illustrates an example graph that illustrates iterative processing results for a jobs profiler.

Among the PDF characteristics, typically only the area of reuse reduces complexity as this is because re-use may can accelerate the raster process avoiding duplication of work. The different characteristics influence the raster process differently and hence these have different weights. The conducted learning highlighted that the weights, in order to maintain a high correlation value, differ for the different PDF classes previously identified. A further capability of the jobs profiler 170 can be to use the raster time results as feedback and iteratively adjust the formula in listed Equation 1 above. A two-iterations result (more iterations can be used) is illustrated in FIG. 2 in a graph 200 demonstrating that the adjustments are reacting suitably to the associated measurements. Classification can be applied to any electronic file that can represent a print medium (e.g., Print Document Language files such as: PDF; PostScript; XPS; PCL; JLYT; Latex; and image files such as GIF; TIFF; MTIFF; JPG; PNG; BMP; and so forth).

For purposes of simplification of explanation, in the example of FIG. 1, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, computer executable instructions, hardware (e.g., an application specific integrated circuit or a processing unit), or as a combination of both. In other examples, the components could be distributed among remote devices across a network.

Figure 3:
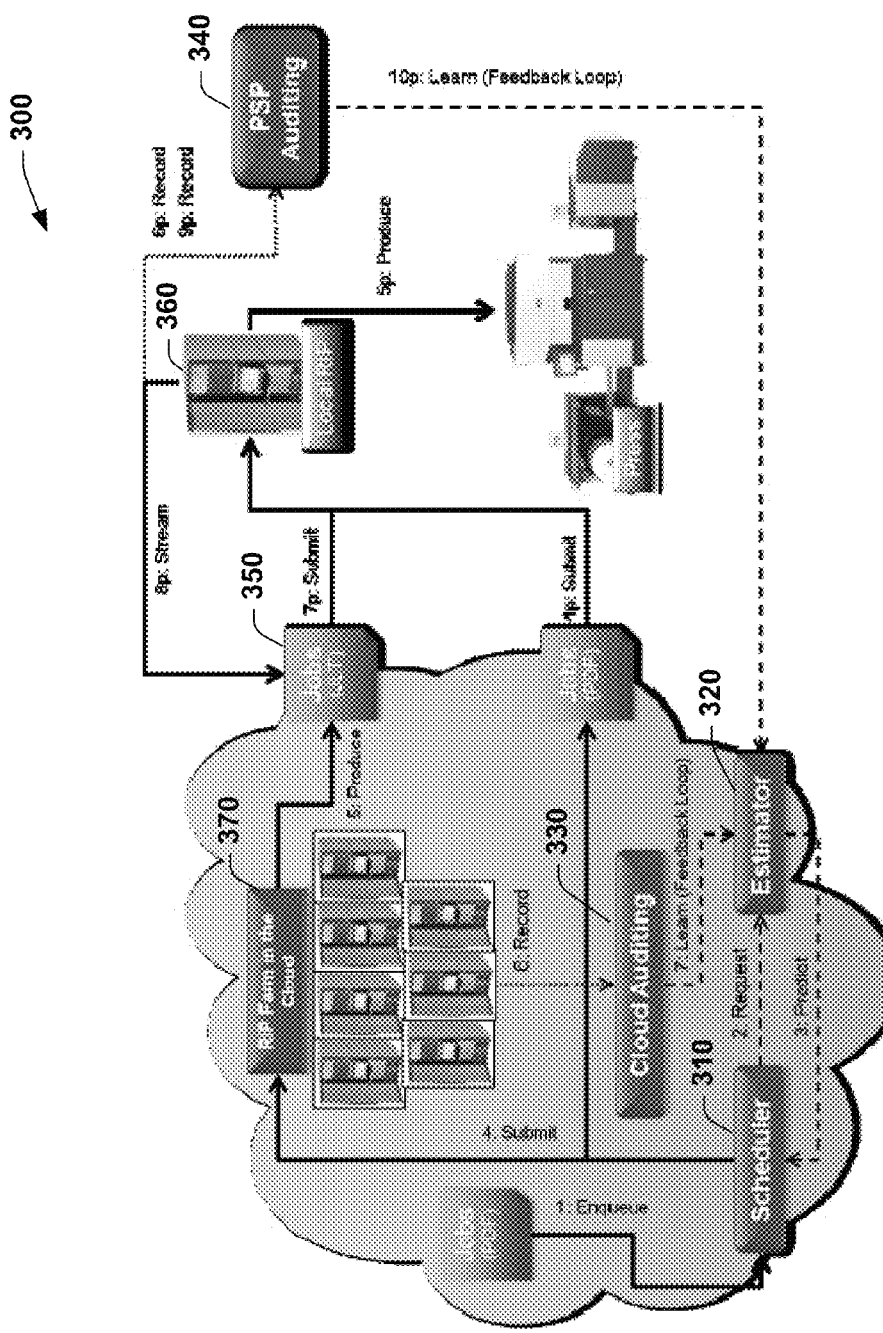
FIG. 3 illustrates an example system where a scheduler and an estimator are implemented on a cloud to perform preprocessing for print jobs.

FIG. 3 illustrates an example system 300 where a scheduler and an estimator 320 are implemented on a cloud to perform preprocessing for print jobs. As shown, the system 300 depicts interaction in a "cloud" driven approach. In this example, the scheduler 310 can be located in the cloud and the estimator collects feedback data from a cloud auditing service (RIP farm) 330 and from PSP auditing 340. The PSP Auditing 340 auditing can provide data regarding the local RIP times as well as the download/streaming time for the JLT (or registered) files at 350. As shown, a local RIP processor can be provided at 360 and a cloud RIP farm can be provided at 370.

Figure 4:
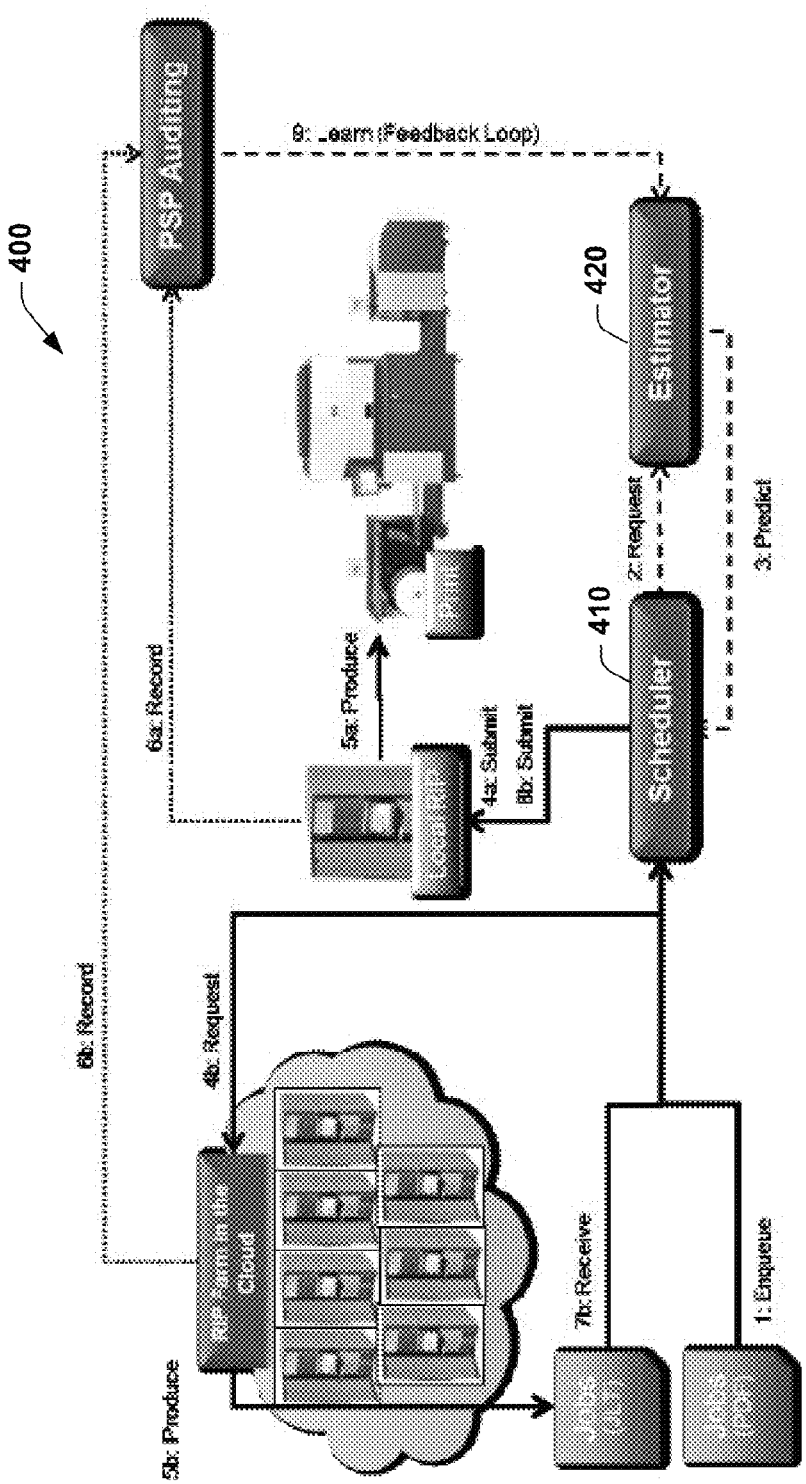
FIG. 4 illustrates an example system where a scheduler and an estimator are implemented locally to perform preprocessing for print jobs.

FIG. 4 illustrates an example system 400 where a scheduler 410 and an estimator 420 are implemented locally to perform preprocessing for print jobs. The system 400 supports a PSP-driven scenario. In this example, the PSP receives jobs from alternative systems than a cloud service. The scheduler 410 and estimator 420 can be operated in the PSP infrastructure and decide when to push jobs in the cloud to take advantage of extra RIPping resources when required. This example can be useful for PSPs to handle the seasonal extra requests without having to over dimension their RIP capabilities. It can also allow the PSP to run lower priority jobs in the cloud and avoid engaging their RIP capabilities for potential rush or more important jobs.

Figure 5:
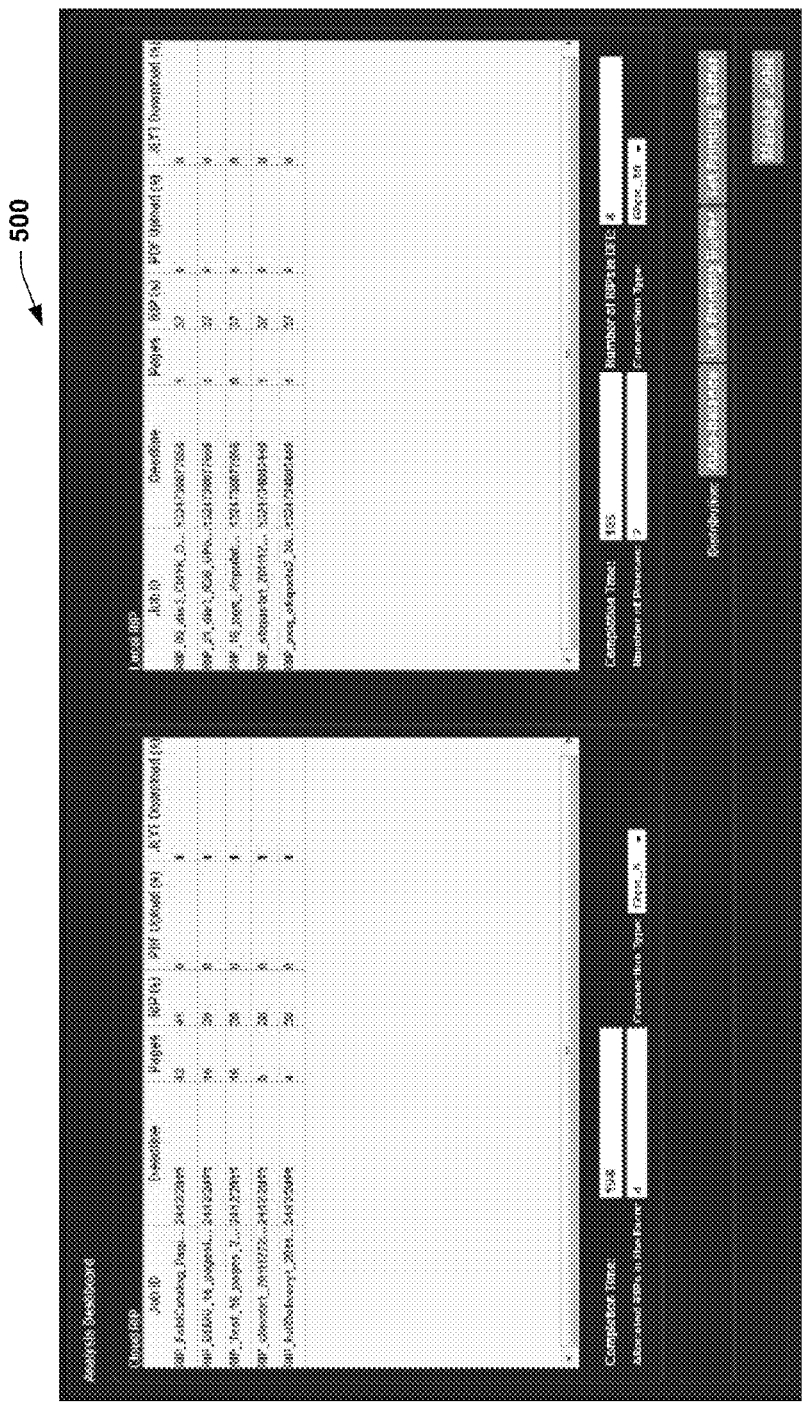
FIG. 5 illustrates an example interface for receiving print job status for preprocessing of print jobs.

FIG. 5 illustrates an example interface 500 for receiving print job status for preprocessing of print jobs. As shown, cloud RIP status is displayed on the left of the interface 500 and local RIP status is displayed on the right of the interface 500. The interface 500 provides user access to the scheduler in the cloud. This scheduler can show all the incoming jobs and allocate them to the Cloud RIP vs. Local RIP based on several configurations and identified capabilities (e.g. number of local vs. cloud RIPs, connection speed, and so forth). The interface 500 allows the user to "Auto-balance" the jobs or set a "Printing Buffer." The example of a "Printing Buffer" is related to allowing enough jobs to be RIPped locally, and hence, reducing the risk, for either important jobs or jobs that are allocated to a specific press shift, for example.

Figure 6:
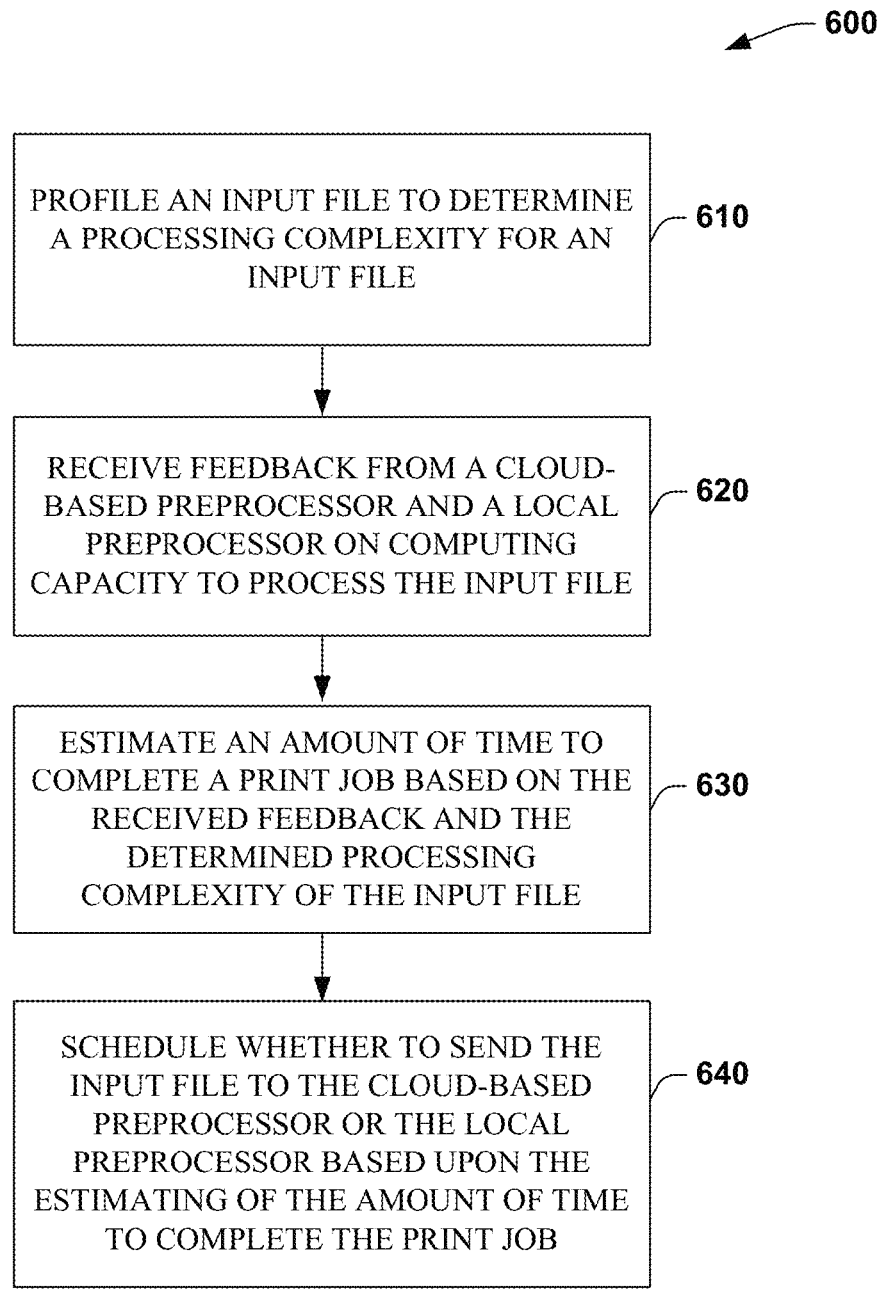
FIG. 6 illustrates an example method that facilitates hybrid cloud preprocessing for print jobs.

In view of the foregoing structural and functional features described above, an example method will be better appreciated with reference to FIG. 6. While, for purposes of simplicity of explanation, the example method of FIG. 6 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example method of FIG. 6 can be implemented as machine-readable instructions that can be stored in a non-transitory computer readable medium, such as can be computer program product or other form of memory storage. The computer readable instructions corresponding to the method of FIG. 6 can also be accessed from memory and be executed by a processor.

FIG. 6 illustrates an example method 600 that facilitates hybrid cloud preprocessing for print jobs. At 610, the method 600 includes profiling an input file to determine a processing complexity for an input file (e.g., via job profiler 170 of FIG. 1). At 620, the method 600 includes receiving feedback from a cloud-based preprocessor and a local preprocessor on computing capacity to process the input file (e.g., via feedback 140 and 150 of FIG. 1). At 630, the method 600 includes estimating an amount of time to complete a print job based on the received feedback and the determined processing complexity of the input file (e.g., via estimator 110 of FIG. 1). At 640, the method 600 includes scheduling whether to send the input file to the cloud-based preprocessor or the local preprocessor based upon the estimating of the amount of time to complete the print job (e.g., via scheduler 160 of FIG. 1). The method 600 can also include employing a raster image processing (RIP) in the cloud-based preprocessor and the local preprocessor to process the input file.

Figure 7:
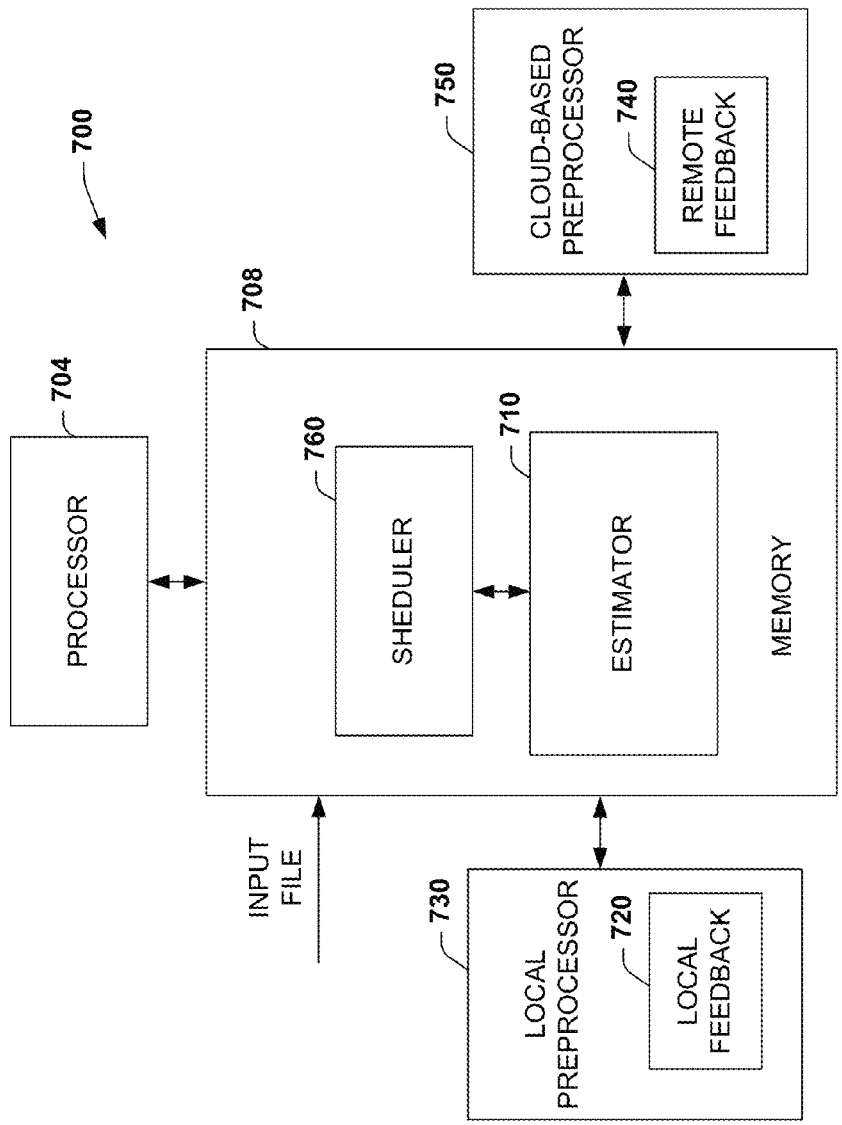
FIG. 7 illustrates an example system that facilitates hybrid cloud preprocessing for print jobs.

FIG. 7 illustrates an example system 700 that facilitates hybrid cloud preprocessing for print jobs. As shown, the system 700 includes a processor 704 and a memory 708 operating instructions to perform the hybrid cloud preprocessing described herein. The memory 708 includes an estimator 710, corresponding to instructions executable by the processor 704, to analyze an input file that describes a print job, to analyze local feedback data 720 that describes local capacity to process the print job by a local print preprocessor 730, and to analyze remote feedback data 740 that describes remote capacity to process the print job by a cloud-based print preprocessor 750. The estimator 710 determines a time estimate for the local print preprocessor 730 or the cloud-based print preprocessor 750 to process the print job based on the analyzed input file, the analyzed local feedback data 720, or the analyzed remote feedback data 740. A scheduler 760, corresponding to instructions executable by the processor 704, receives the time estimate from the estimator 710 to determine whether to route the print job to the local print preprocessor 730 or the cloud-based print preprocessor 750 to process the print job.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
    an estimator, executable by at least one processor, to analyze an input file that describes a print job, to analyze local feedback data that describes local capacity to process the print job by a local raster image processor (RIP), and to analyze remote feedback data that describes remote capacity to process the print job by a cloud-based RIP, wherein the estimator determines a time estimate for the local RIP or the cloud-based RIP to process the print job based on the analyzed input file, the analyzed local feedback data, or the analyzed remote feedback data;
    a scheduler, executable by the at least one processor, that receives the time estimate from the estimator to determine whether to route the print job to the local RIP or the cloud-based RIP to process the print job; and
    a user interface to provide processing for the input file from the local print preprocessor or the cloud-based print preprocessor, wherein the user interface enables adjustment of a load-balancing function or enables setting of a print buffer size.

2. The system of claim 1, wherein the local RIP and the cloud-based RIP receive the input file that describes the print job and generate an output file suitable for a printer to print the print job.

3. The system of claim 1, further comprising a job profiler that operates with the estimator and the scheduler to analyze the input file, wherein the job profiler employs a learning component to analyze characteristics of the input file.

4. The system of claim 3, wherein the estimator, the scheduler, and the job profiler operate on a cloud-based system, operate at a print service provider, or operate at the cloud-based system and the print service provider.

5. The system of claim 3, wherein the characteristics analyzed by the job profiler include a file size parameter, a page size parameter, a number of pages parameter, an overall area without reuse parameter, an overall area with reuse parameter, or a transparency pervasiveness parameter.

6. The system of claim 5, wherein the parameters are classified by the job profiler into a plain documents class, a transparent documents class, or a reuse documents class.

7. The system of claim 6, wherein the job profiler applies an iterative learning process to classify the parameters.

8. The system of claim 6, wherein the parameters are classified from an electronic file that represents a print medium.

9. The system of claim 1, further comprising an auditor component to supply the local feedback data or the remote feedback data.

10. A method comprising:
    profiling, by at least one computer, an input file for a print job to determine a processing complexity for the input file;
    receiving, by the at least one computer, feedback from a cloud-based preprocessor and a local preprocessor on computing capacity to process the input file;
    estimating, by the at least one computer, an amount of time for each of the cloud-based preprocessor and the local preprocessor to complete the print job based on the received feedback, and the determined processing complexity of the input file; and
    determining, by the at least one computer, whether to send the input file to the cloud-based preprocessor, the local preprocessor or both the cloud-based preprocessor and the local preprocessor based upon the estimated amounts of time to complete the print job and a deadline to complete the print job.

11. The method of claim 10, further comprising employing a raster image processing (RIP) in the cloud-based preprocessor and the local preprocessor to process the input file.

12. A system comprising:
    a profiler to analyze an input file for a print job, and determine an amount of transparency, reuse, and objects for the print job from the analysis;
    an auditor to determine feedback from a cloud-based preprocessor or a local preprocessor on computing capacity to process the input file;
    an estimator to determine an amount of time for each of the cloud-based preprocessor and the local preprocessor to complete the print job based on the received feedback and the determined amount of transparency, reuse, and objects for the print job; and
    a scheduler to determine whether to send the input file to the cloud-based preprocessor, the local preprocessor or both the cloud-based preprocessor and the local preprocessor based upon the determined amount of times to complete the print job by the estimator.

13. The system of claim 12, wherein the local preprocessor or the cloud-based preprocessor employs a raster image processing to process the input file.

14. The system of claim 12, wherein the estimator determines the amount of time for each of the cloud-based preprocessor and the local preprocessor to complete the print job based on existing print jobs for the cloud-based preprocessor and the local preprocessor.

15. The system of claim 12, wherein the job profiler includes a learning component to iteratively analyze characteristics of input files and determine correlations between the characteristics and an amount of time to process an input file including the characteristics from the iterative analysis, and wherein the estimator determines the amounts of time from the correlations.

16. The method of claim 10, wherein the profiling comprises determining an amount of transparency, reuse, and objects for the print job from the analysis; and the estimating comprises determining the amount of time for each of the cloud-based preprocessor and the local preprocessor to complete the print job based on the determined amount of transparency, reuse, and objects for the print job.

17. The method of claim 10, wherein the profiling comprises determining parameters of the print job, wherein the parameters include a file size parameter, a page size parameter, a number of pages parameter, an overall area without reuse parameter, an overall area with reuse parameter, or a transparency pervasiveness parameter; and
classifying the parameters into a plain documents class, a transparent documents class, or a reuse documents class.

18. The method of claim 10, comprising:
providing processing for the input file from the local print preprocessor or the cloud-based print preprocessor via a user interface, wherein the user interface enables adjustment of a load-balancing function or enables setting of a print buffer size.

\* \* \* \* \*